United States Patent [19]

Roters

[11] 3,873,675

[45] Mar. 25, 1975

[54] CATALYST AND CATALYST ARRANGEMENT FOR THE PRODUCTION OF NITRIC ACID

[75] Inventor: Hans Roters, Hanau, Germany

[73] Assignee: Deutsche Gold-und Silber-Scheideanstalt Vormals Roessler, Frankfurt am Main, Germany

[22] Filed: Oct. 9, 1973

[21] Appl. No.: 404,207

Related U.S. Application Data

[62] Division of Ser. No. 288,332, Sept. 12, 1972.

[30] Foreign Application Priority Data

Sept. 14, 1971 Germany .............................. 2145842

[52] U.S. Cl. ................................................. 423/403
[51] Int. Cl. ............................................ C01b 21/26
[58] Field of Search ............ 423/392, 403; 252/472; 75/172

[56] References Cited
UNITED STATES PATENTS

| | | | |
|---|---|---|---|
| 1,321,376 | 11/1919 | Jones et al. ......................... | 423/403 |
| 1,927,508 | 9/1933 | Titlestad et al. ..................... | 423/392 |
| 2,148,680 | 2/1939 | Brack .................................. | 252/472 |
| 2,267,753 | 12/1941 | Ruthardt ............................. | 252/472 |
| 2,279,763 | 7/1941 | Sivil ..................................... | 75/172 |

FOREIGN PATENTS OR APPLICATIONS

| | | | |
|---|---|---|---|
| 570,071 | 6/1945 | United Kingdom ................ | 423/403 |
| 63,223 | 12/1942 | Norway ............................. | 75/172 E |

OTHER PUBLICATIONS

Chemical Abstracts, Vol. 70, 1969, p. 108, 655.

*Primary Examiner*—G. O. Peters
*Attorney, Agent, or Firm*—Cushman, Darby & Cushman

[57] ABSTRACT

A catalyst for the oxidation of ammonia, especially in the form of finely meshed wire gauze, is employed which contains 40 to 75% palladium, 1 to 8% rhodium and/or ruthenium and the balance being platinum.

6 Claims, No Drawings

CATALYST AND CATALYST ARRANGEMENT FOR THE PRODUCTION OF NITRIC ACID

This is a division of application Ser. No. 288,332 filed Sept. 12, 1972.

The object of the invention is the development of a catalyst made of a palladium alloy especially in the form of finely meshed wire gauze useful for the oxidation of ammonia in the industrial production of nitric acid, and the arrangement of the catalyst gauze to gauze packets.

For the catalytic oxidation of ammonia to nitrogen oxides in the production of nitric acid there are used combustion plants which generally are provided with platinum catalysts in the form of finely meshed wire gauze. In present day plants the catalyst consists almost exclusively of a binary platinum alloy with several percent of rhodium, preferably platinum with 10 percent rhodium. This catalyst gauze has mostly a mesh number of 1024 meshes/cm$^2$ and a wire diameter of 0.06–0.09 mm.

In carrying out the oxidation of ammonia industrially there is led a mixture of ammonia and air over a horizontally arranged catalyst gauze system of several individual gauzes lying directly on top of each other and the combustion takes place there at a temperature of 750°–950° C. Since the oxidation of ammonia is an exothermic process, the reaction runs by itself if the gaseous mixture is ignited at the beginning.

The life of the catalyst gauze, according to the conditions, only amounts to about 2 to 18 months since the surfaces of the wires are very severely roughened after a short time during the operation, so that the wires gradually lose their mechanical strength and tear. This change in the surface structure of the catalyst gauze characterized by moireing, to be sure, on the one hand is very desired since it is accompanied by an increased yield in the production of the nitrogen oxides, but on the other hand, together with the chemical reactions occurring on the wire surface is the cause of loss of catalyst material which becomes entrained in the gaseous stream, partially in the form of minute particles and partially in gaseous form. These losses of noble metal are in the order of magnitude of 0.2 to 2 grams per ton of reacted nitrogen (based on the ammonia nitrogen) according to the operating conditions, such as pressure and temperature of combustion. Above all, in the art preferred pressure plants today, these noble metal losses are very high.

Therefore, in the past there have not lacked attempts to reduce these losses of noble metal not only quantitatively but also qualitatively.

Thus, for example, there are known a series of processes to recover the noble metal entrained in the gas stream after the ammonia combustion. Above all, there is attached to this process the disadvantage that only a portion of this noble metal can be recovered again with economically defensible expense while the rest remains in the gas stream and is lost therewith.

Furthermore, there has been tried the addition of cheap oxides of non-noble metals in place of the expensive platinum-rhodium alloys as catalysts in the combustion of ammonia. Especially there have been tried iron-bismuth oxide and cobalt oxide. These catalysts, however, result in lower nitrogen oxide yields and after a short time exhibit such a great reduction in activity that they find practically no use today.

There have also been attempts to replace the expensive noble metals platinum and rhodium entirely or partially by cheaper noble metals or non-noble metals. Thus, there are alloyed with the platinum or the platinum-rhodium alloy, for example, several percent of palladium, rhenium, antimony, thorium, or cobalt. These alloys, however, cannot be employed in practice since their addition is accompanied by either increased loss of noble metal or reduced yields of nitrogen oxides.

Furthermore, there have already been proposed catalyst gauzes of alloys containing over 40 percent platinum less than 50 percent palladium and up to 10 percent of rhenium. However, these alloys also show increased weight losses and a short life of the gauze produced therefrom, so that they do not play a role in practice.

Also, a recent proposal in German Offenlegungsschrift 1,959,137 is to use an alloy containing 75–82 percent platinum, 15–22 percent palladium, 2–3.5 percent rhodium and 0.05–0.15 percent of gold, iron and iridium bringing about no essential improvement since the losses of noble metal still are always relatively high.

Therefore, the problem of the present invention was to develop a catalyst with which the losses of noble metal, at least qualitatively, can be reduced substantially in the catalytic combustion of ammonia without the yield of nitrogen oxides falling off in comparison to those attainable with platinum-rhodium catalysts.

It has now been found unexpectedly that catalyst gauzes of palladium alloys containing 40 to 75 percent palladium 1 to 8 percent rhodium and/or ruthenium, balance platinum, provide practically equal yields of nitrogen oxides in the ammonia oxidation as the previously used platinum-rhodium gauzes (94 to 98.5 percent according to operating conditions) but which have substantially lower noble metal losses both qualitatively and also weightwise than known metal catalysts. The life of the catalyst gauzes of the invention corresponds approximately to the platinum-rhodium gauze and is partially even longer.

Especially proven good are catalyst gauzes of alloys which contain 55 to 70 percent palladium 1 to 6 percent rhodium and/or ruthenium, balance platinum.

Of especial advantage with the catalyst alloys of the invention is the fact that these alloys not only possess an excellent catalytic activity in the combustion of ammonia but also are in a position to again recover in the catalytic combustion volatile noble metals, especially platinum with greater effectiveness whereby above all, the platinum losses are able to be especially effectively reduced in the industrial production of nitric acid.

Therefore, it is especially advantageous to use gauze packets of several individual gauzes of the invention in the industrial combustion of ammonia, in which the gauzes on the gas inlet side of the gauze packets are platinum richer and palladium poorer than on the gas outlet side, since especially the palladium rich gauzes have the greatest collecting action for platinum and are especially effective in removing the platinum volatilized in small amounts from the gas stream.

There has proven especially good gauze packets in which one or more gauzes of the known platinum-rhodium catalysts are found on the gas inlet side since these guarantee a better ignitibility of the incoming ammonia-air mixture and several of the catalyst gauzes of palladium alloys of the invention are joined thereto whereby these catalyst gauzes of the invention all either have the same composition or can be graduated in their palladium content.

Naturally, there can also be attached on the catalyst gauze packet a known apparatus for the recovery of platinum residues, as for example a gauze packet of a palladium-gold alloy.

The catalysts of the invention have the advantage that because of the high content of the relatively cheap palladium the catalyst gauzes are cheaper than those previously used of platinum-rhodium. Also, since palladium has a much lower specific gravity than platinum, the catalyst gauzes of the invention are lighter than platinum-rhodium gauzes which also pares the investment cost for the gauze packets in the industrial production of nitric acid.

Since the catalyst of the invention is commensurately worth the price, on the other hand, the wire diameter of the gauzes also can be increased (to 0.10 to 0.15 mm) and thereby their life increased considerably.

The catalysts of the invention and the gauze packets of the invention are useful in all industrial plants for the production of nitric acid, both in normal pressure installations and pressurizers at combustion temperatures of 750° to 950°C. However, they have proven especially good in high pressurizers at about 7 atmospheres absolute and 950° C. It is again emphasized, however, that there can be used any of the temperatures and pressures conventionally employed in the catalytic oxidation of ammonia to nitrogen oxides, e.g. 750° to 950° C. at 1 to 9 atmospheres.

The catalysts of the invention can be used either as wire gauzes or in other forms, as for example as expanded metal or on carriers.

The especial advantages of the catalysts of the invention and the arrangement of the invention can be seen from the following examples.

In the oxidation of ammonia with air there is normally used 10 to 13 percent by volume of ammonia with the balance air. The wire gauzes conveniently can have 900 to 1024 meshes/cm$^2$.

Unless otherwise indicated all parts and percentages are by weight.

EXAMPLE 1

There were inserted in a pressurizer for the industrial production of nitric acid at 7 atmospheres absolute and a combustion temperature of 950° C. five gauzes of an alloy of 43 percent palladium, 50 percent platinum and 7 percent rhodium as a catalyst for the combustion of an ammonia-air mixture containing 10 percent by volume of ammonia. The gauzes had a mesh number of 1024 meshes/cm$^2$ and a wire diameter of 0.10 mm. After use of the gauzes for 72 days, they showed a weight loss as set forth in Table 1. Table 2 represents the comparison weight loss using 5 platinum-rhodium gauzes containing 10 percent rhodium which were installed in the same plant for the same length of time.

In both cases 94 percent of the ammonia was converted to nitrogen oxides.

As can be seen, the five catalyst gauzes of the invention only underwent a total weight loss of 323.3 grams while the weight loss of the known Pt/10Rh gauzes amounted to 544.5 grams. By the use of a gauze packet of 5 catalyst gauzes of the invention from an alloy of 43Pd/40Pt/7Rh there was reduction of about 40 percent less noble metal loss compared to a gauze packet of five gauzes of platinum containing 10 percent Rh.

TABLE 1

| GAUZE NUMBER | WEIGHT LOSS (GRAMS) |
|---|---|
| 1 | 112.2 |
| 2 | 79.6 |
| 3 | 58.1 |
| 4 | 44.0 |
| 5 | 29.4 |
| Total | 323.3 |

TABLE 2

| GAUZE NUMBER | WEIGHT LOSS (GRAMS) |
|---|---|
| 1 | 113.4 |
| 2 | 117.6 |
| 3 | 113.1 |
| 4 | 104.8 |
| 5 | 95.6 |
| Total | 544.5 |

EXAMPLE 2

In a plant similar to that of Example 1, there was installed as the catalyst a gauze packet of five gauzes of an alloy of 65 percent palladium, 32 percent platinum and 3 percent rhodium. Its weight loss after 34 days is shown in Table 3 wherein there is also shown the comparison weight loss of a gauze packet of five gauzes of platinum with 10 percent rhodium in the same plant for the same time.

In this case the saving of the volatile noble metal in the five catalyst gauzes of the invention was about 45 percent in comparison to the known Pt/10Rh gauzes.

TABLE 3

| GAUZE NUMBER | WEIGHT LOSS (GRAMS) | |
|---|---|---|
| | 65 Pd/32Pt/3Rh | 90 Pt/10Rh |
| 1 | 55.2 | 65.6 |
| 2 | 43.8 | 83.0 |
| 3 | 35.2 | 72.0 |
| 4 | 28.3 | 65.0 |
| 5 | 22.6 | 56.1 |
| Total | 185.1 | 341.6 |

EXAMPLE 3

In the same plant as in Example 2 there was installed a gauze packet of five gauzes of an alloy of 55 percent palladium 40 percent platinum and 5 percent rhodium. After 44 days there was a total weight loss of 269 grams compared to 505 grams for five gauzes of 90 percent platinum 10 percent rhodium used in the same plant for the same time. This was a saving of about 47 percent.

In all of these experiments the analysis of the catalyst gauzes showed that the weight loss of the gauzes of the invention depended primarily on the loss of the palladium constituent, which was higher than its percentage proportion of the alloy. This means that instead of the expensive platinum the cheaper palladium was lost or that the gauzes on the gas exit side of the gauze packet absorbed again the platinum entrained in the gas stream.

In the use of the catalysts of the invention in the industrial nitric acid production there is not only a saving weightwise of the noble metal volatilized with the gas stream but also in the higher amount qualitatively.

The results in the Examples are not changed if the rhodium in the catalysts of the invention is replaced partially, e.g., 50 percent, or completely by ruthenium.

The catalysts of the invention can have the usual impurities present in palladium and platinum.

EXAMPLE 4

In a plant similar to that of Example 1, there was installed as the catalyst a gauze packet of 5 gauzes of different alloys as shown in table 4. The time of operation had been 69 days. During this time a total loss of 422 grams was observed, compared with 746 grams when Pt/10Rh gauzes were used. As shown by the analysis it was found that the main part of the total loss consisted of palladium.

TABLE 4

| Gauze Number | | Weight Loss (Grams) | |
| --- | --- | --- | --- |
| | | | Pt10Rh |
| 1 | 40Pd/53Pt/7Rh | 82 | 160 |
| 2 | 40Pd/53Pt/7Rh | 74 | 176 |
| 3 | 50Pd/43Pt/7Rh | 81 | 145 |
| 4 | 70Pd/23Pt/7Rh | 95 | 136 |
| 5 | 70Pd/23Pt/7Rh | 90 | 129 |
| Total | | 422 | 746 |

What is claimed is:

1. In a process of forming oxides of nitrogen by the gas phase oxidation of ammonia with air in the presence of a platinum containing catalyst the improvement comprising employing as the catalyst a catalyst consisting essentially of 55 to 70 percent palladium, 1 to 6 percent of a member of the group consisting of rhodium and ruthenium and mixtures thereof, and the balance being platinum.

2. A process according to claim 1, wherein the oxidation is carried out in a reaction zone having a gas inlet and a gas outlet and the exiting gas is passed through a gauze packet of said catalyst.

3. A process according to claim 2, wherein the entering gases are passed through a gauze packet of a platinum alloy containing catalyst having a lower palladium content than the gauze packet at the gas outlet.

4. A process according to claim 1 wherein said member is rhodium.

5. A process according to claim 1 wherein said member is ruthenium.

6. A process according to claim 3 wherein the gauze packet at the gas outlet side has 70 percent Pd.

* * * * *